United States Patent [19]
Curran et al.

[11] Patent Number: 5,247,659
[45] Date of Patent: Sep. 21, 1993

[54] METHOD FOR BOOTSTRAP LOADING IN A DATA PROCESSING SYSTEM COMPRISING SEARCHING A PLURALITY OF PROGRAM SOURCE DEVICES FOR A BOOTSTRAP PROGRAM IF INITIAL DATA INDICATING A BOOTSTRAP PROGRAM SOURCE DEVICE FAILS A VALIDITY CHECK

[75] Inventors: Michael W. B. Curran, Goostrey; Marek S. Pierkarski, Macclesfield; Richard N. Taylor, Congleton, all of Great Britain

[73] Assignee: International Computers Limited, London, England

[21] Appl. No.: 946,036

[22] Filed: Sep. 15, 1992

Related U.S. Application Data

[63] Continuation of Ser. No. 413,466, Sep. 27, 1989, abandoned.

[30] Foreign Application Priority Data

Oct. 6, 1988 [GB] United Kingdom ............... 8823509

[51] Int. Cl.⁵ .................. G06F 9/445; G06F 11/00
[52] U.S. Cl. ..................... 395/575; 395/700; 395/725; 364/DIG. 1; 364/265.3; 364/266.5; 364/268.3; 364/268.5; 364/280.2; 364/280.3
[58] Field of Search .............. 395/200, 425, 575, 650, 395/700, 725; 364/DIG. 1, DIG. 2

[56] References Cited

U.S. PATENT DOCUMENTS

| | | | |
|---|---|---|---|
| Re. 27,703 | 7/1973 | Stafford et al. | 364/200 |
| 3,771,137 | 11/1973 | Barner et al. | 395/425 |
| 4,030,073 | 6/1977 | Armstrong, Jr. | 364/200 |
| 4,204,249 | 5/1980 | Dye et al. | 364/200 |
| 4,237,533 | 12/1980 | Mills et al. | 395/700 |
| 4,412,281 | 10/1983 | Works | 395/575 |
| 4,430,699 | 2/1984 | Segarra et al. | 395/650 |
| 4,466,063 | 8/1984 | Segarra et al. | 395/650 |
| 4,491,914 | 1/1985 | Susaku | 364/200 |
| 4,648,031 | 3/1987 | Jenner | 364/200 |
| 4,654,821 | 3/1987 | Lapp | 364/900 |
| 4,663,539 | 5/1987 | Sharp et al. | 364/200 |
| 4,683,531 | 7/1987 | Kelch et al. | 395/725 |
| 4,752,870 | 6/1988 | Matsumura | 364/200 |
| 4,782,355 | 11/1988 | Sakai et al. | 364/900 |
| 4,800,488 | 1/1989 | Agrawal et al. | 364/200 |
| 4,803,623 | 2/1989 | Klashka et al. | 364/200 |
| 4,876,643 | 10/1989 | McNeill et al. | 395/200 |
| 4,914,571 | 4/1990 | Baratz et al. | 365/600 |
| 4,943,911 | 7/1990 | Kopp et al. | 364/200 |
| 5,008,814 | 4/1991 | Mathur | 364/200 |

Primary Examiner—Thomas C. Lee
Assistant Examiner—John C. Loomis
Attorney, Agent, or Firm—Lee, Mann, Smith, McWilliams, Sweeney & Ohlson

[57] ABSTRACT

A data processing system comprises a plurality of processing modules, and a central services module, connected by a system bus. Details of the expected system configuration and of a normal bootstrap load path are held in a non-volatile store. On power-up or system restart, the non volatile store is tested. If the test is satisfactory, a defined bootstrap procedure is executed; otherwise an undefined bootstrap procedure is performed. The defined bootstrap procedure compares the expected configuration with the actual system configuration. If they match, the bootstrap program is loaded from the normal load path. If they do not match, the undefined bootstrap procedure may be entered. In the undefined bootstrap procedure, the central services module searches for possible bootstrap load paths and attempts a load from one of these paths. The defined bootstrap is expected to be the normal procedure, and is faster. The undefined bootstrap is entered automatically whenever it appears that the non-volatile store has not been set up, and provides a way of loading the system without any bootstrap load path having to be specified.

1 Claim, 5 Drawing Sheets

METHOD FOR BOOTSTRAP LOADING IN A DATA PROCESSING SYSTEM COMPRISING SEARCHING A PLURALITY OF PROGRAM SOURCE DEVICES FOR A BOOTSTRAP PROGRAM IF INITIAL DATA INDICATING A BOOTSTRAP PROGRAM SOURCE DEVICE FAILS A VALIDITY CHECK

This application is a continuation of application Ser. No. 413,466, filed Sep. 27, 1989, now abandoned.

This invention relates to a bootstrap mechanism for a data processing system.

When a data processing system is powered up, it is usually necessary to load programs into the system memory from some external source, such as a disc or tape. This initial loading may be performed by a so-called bootstrap mechanism. Typically, this first loads a small program, referred to as a bootstrap, into the memory. The bootstrap program tests the system, and then loads the actual programs for normal operation.

A problem with conventional bootstrap mechanisms is that they are relatively inflexible, in that they generally assume that the bootstrap will always be loaded from a predefined bootstrap load path — for example from a particular disc drive. This inflexibility presents a particular problem in the case of a modular system in which modules can be added or replaced to suit the user's requirements.

The object of the present invention is to avoid this inflexibility.

SUMMARY OF THE INVENTION

According to the invention there is provided a number of data processing modules. Each module is connected to at least one program source device such as a peripheral device or network interface. The system also includes a central services module which is connected to all the data processing modules, for example by a system bus. In operation, the central services module instructs all the processing modules in parallel to search for programs. The central services module then polls each of the processing modules in turn, until it finds one that has found a program source device containing a bootstrap program. The central services module then instructs that processing module to load and execute the bootstrap program.

Thus, it can be seen that it is not necessary to specify a fixed source device for the bootstrap program. Moreover, because all the processing modules search in parallel for source devices containing bootstrap programs, the operation can be very fast.

BRIEF DESCRIPTION OF THE DRAWINGS

One data processing system embodying the invention will now be described by way of example with reference to the accompanying drawings.

DESCRIPTION OF AN EMBODIMENT OF THE INVENTION

Figure 1:
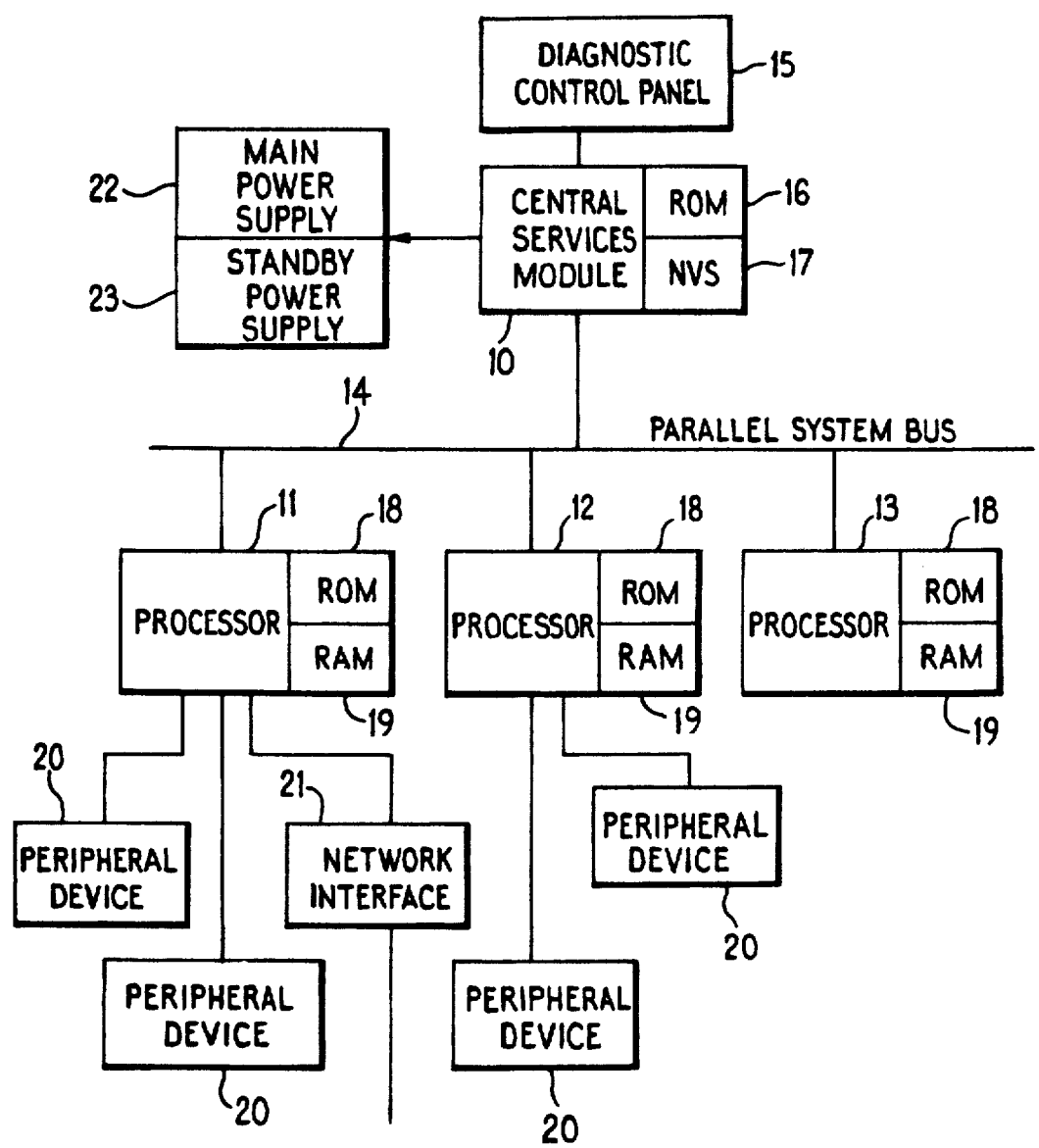
FIG. 1 is a block diagram of the overall system.

Referring to FIG. 1, the data processing system comprises a central services module (CSM) 10, and a number of processing modules 11, 12, 13. The modules 10-13 are all interconnected by a parallel system bus 14.

The purpose of the CSM is to provide overall administration of the system. In particular, as will be described in more detail later, the CSM controls the bootstrap procedures for loading programs.

The CSM is provided with a diagnostic control panel 15 which comprises a display screen and a number of manually operable keys. The screen allows the system to display messages, such as diagnostic messages, or menus. The keys allow the system user to respond to the diagnostic messages, or to select options from menus.

THe CSM includes a read-only memory (ROM) 16 which holds firmware for the CSM. The CSM also includes a battery-backed memory 17, referred to herein as the non-volatile store (NVS), which preserves information even when the power supply to the CSM is switched off.

Each of the processing modules 11-13 comprises a processing unit having a ROM 18 for holding firmware, and a random-access memory (RAM) 19 for holding programs and data.

In the present example, two of the processing modules 11 and 12 act as input/output controllers, and are connected to peripheral devices 20 such as disc files and magnetic tape units. Also, in this example, the processing module 11 is connected by way of an interface 21 to a local area or wide area network, to allow it to communicate with other computer systems. The processing module 13, on the other hand, is dedicated to processing data, and has no peripherals or network connections.

The non-volatile store 17 is used in established systems to hold various items of system information, including the following.

(a) A system configuration table: this indicates the types of modules connected to the various slots of the system.

(b) Normal load route NLR: this indicates the normal bootstrap load path for the system.

(c) Alternative load route ALR this identifies an alternative bootstrap load path which can be used if the normal bootstrap load path fails.

The system includes a power supply unit, comprising a main power supply 22 and a standby power supply 23. The main power supply provides power for the whole system, whereas the standby power supply provides power only for the CSM. The power supplies are controlled by CSM. In normal operation, the main power supply is selected. In a standby mode, only the standby power supply is active, and so power dissipation is at a minimum and no forced-air cooling is required for the system.

Operation of CSM

Figure 2:
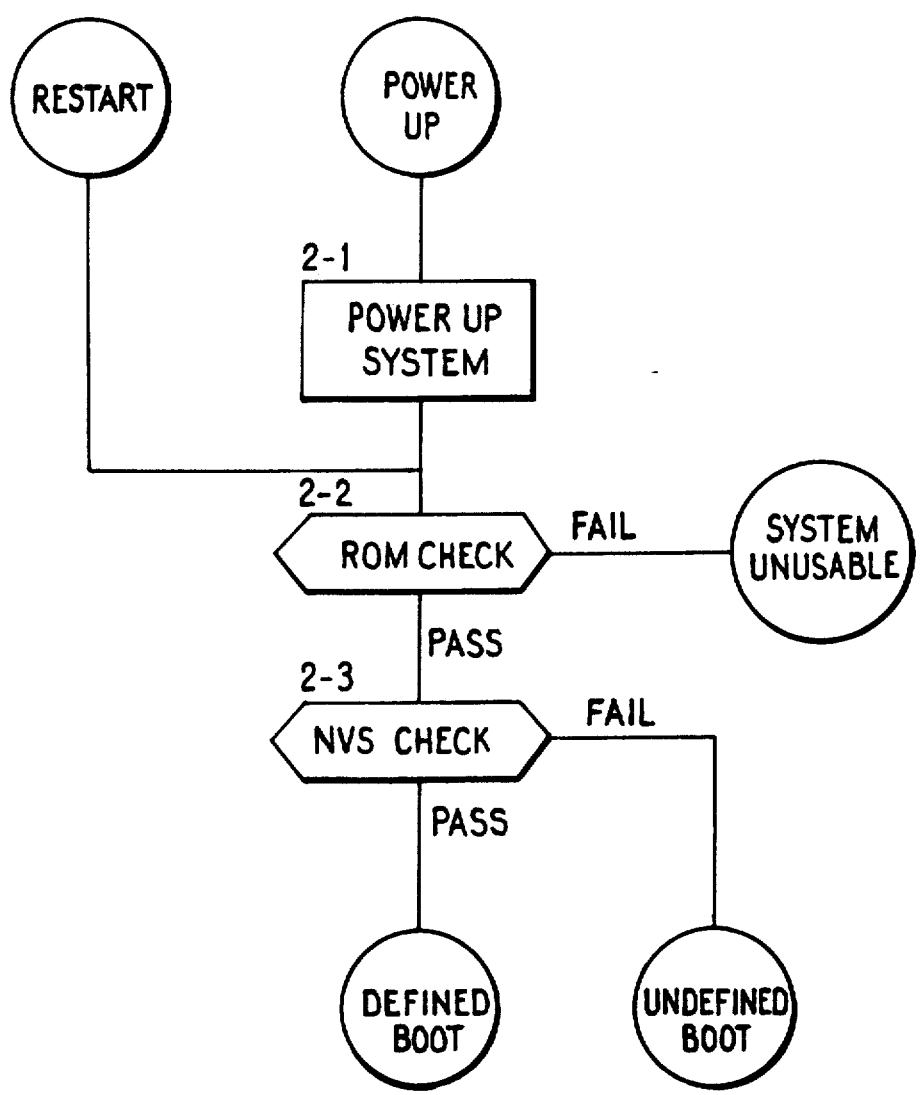
FIG. 2 is a flow diagram showing the operation of a central services module.

Referring to FIG. 2, this shows the operation of the CSM.

As mentioned above, in the standby mode the CSM is powered by the standby power supply, and the rest of the system is unpowered. In this state, the CSM instructs the diagnostic control panel 15 to display a menu. One option on this menu is to power-up the system.

(2-1) When the power-up is selected, the CSM switches on the main power supply, so that all the other modules in the system are now powered.

(2-2) The CSM then performs a sum check on the contents of its ROM. Failure of this check means that the system is unusable and so the CSM displays an error message and then halts.

(2-3) If the ROM check is satisfactory, the CSM performs a similar check on the contents of the NVS. If this check is satisfactory, the CSM proceeds with a defined bootstrap procedure, to be described below with reference to FIG. 3. If, on the other hand, the NVS check fails, then the CSM proceeds with an undefined bootstrap procedure, to be described below with reference to FIG. 4.

If the system is re-started at any time, the action of the CSM is similar to that described above, except that in this case, as shown in FIG. 2, it is not necessary to power-up the system, since in this case the system will already be powered up.

Defined bootstrap

Figure 3:
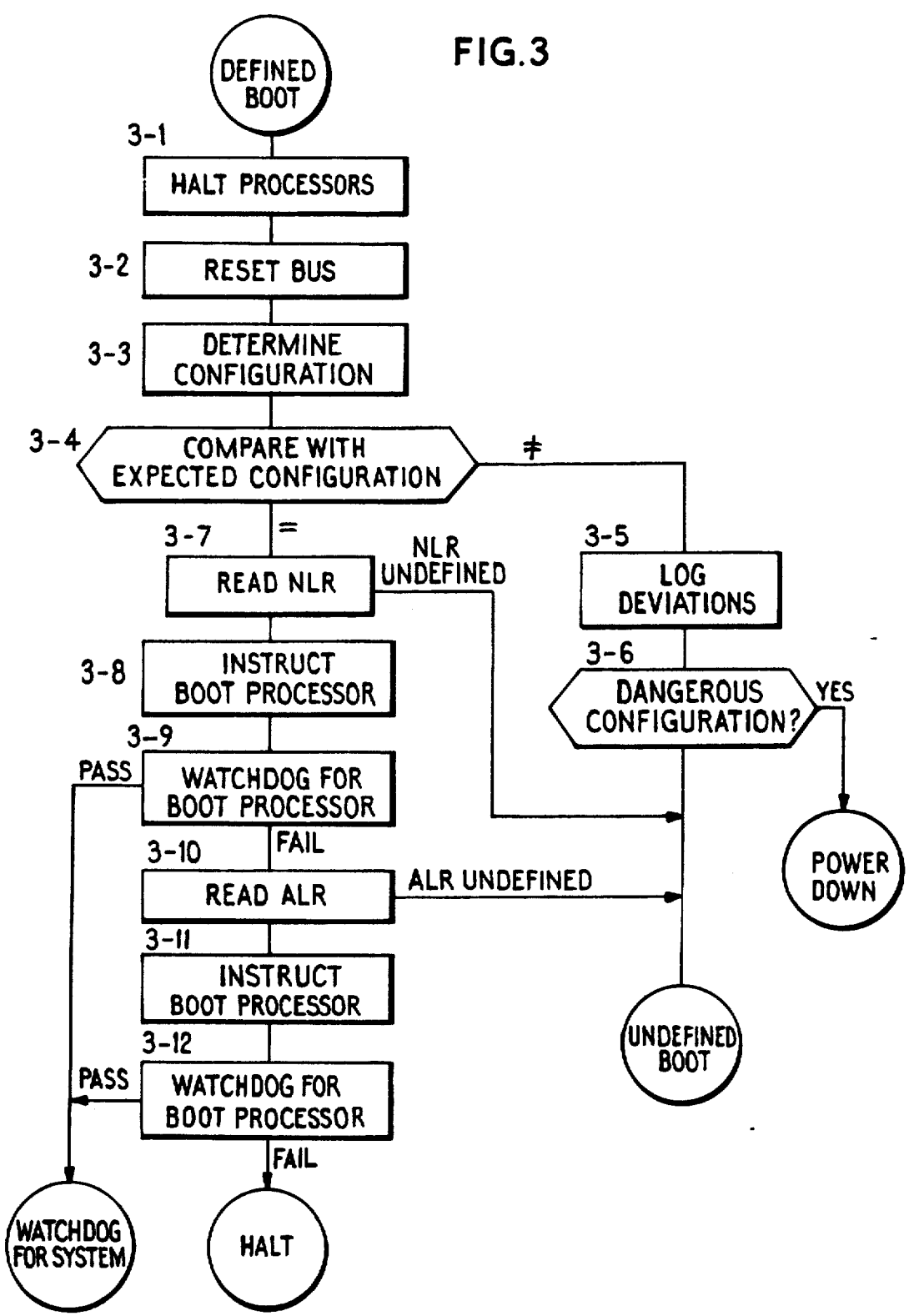
FIG. 3 is a flow diagram showing a defined bootstrap procedure.

Referring now to FIG. 3, this shows the defined bootstrap procedure performed by the CSM.

(3-1) The CSM halts all the processing modules in the system by sending a HALT command over the system bus. The CSM checks that all the processing modules have halted as instructed. If they have not all halted within a predetermined timeout period (one second in this example), a CSM produces a diagnostic error message on the diagnostic control panel. The step of halting the processing module is necessary only if the bootstrap procedure is being performed as the result of a system reset; it is omitted in the case of a power-up.

(3-2) The CSM then resets the system bus. As will be described later, this causes each processing module to be reset and then to run a self-test routine.

(3-3) The CSM then interrogates in turn each slot position of the system bus, so as to determine whether a processing module is connected to that slot and to read the status of that processing module. In this way, the CSM can discover the actual configuration of the system.

(3-4) The actual configuration of the system is compared with the expected configuration, held in the non-volatile store 17. The actual configuration may differ from the expected configuration either because the system has been modified in some way, or because the non-volatile store has not yet been initialised.

(3-5) If the actual configuration does not match the expected configuration, the deviations are recorded in an event log, held in the non-volatile store 17. A diagnostic message is displayed on the diagnostic control panel 15.

(3-6) The actual configuration is then checked to determine whether it is potentially dangerous. For example, the system may include two or more different types of processing module which make use of the individual lines of the system bus in different ways. This is considered to be dangerous, since it is possible that two modules may attempt to drive the same bus line simultaneously, and this could result in electrical damage to the bus or to the modules.

If a dangerous configuration is detected, the CSM immediately switches off the main power supply, so as to prevent any damage. The CSM continues running on the standby power supply, and displays a diagnostic message.

Figure 4:
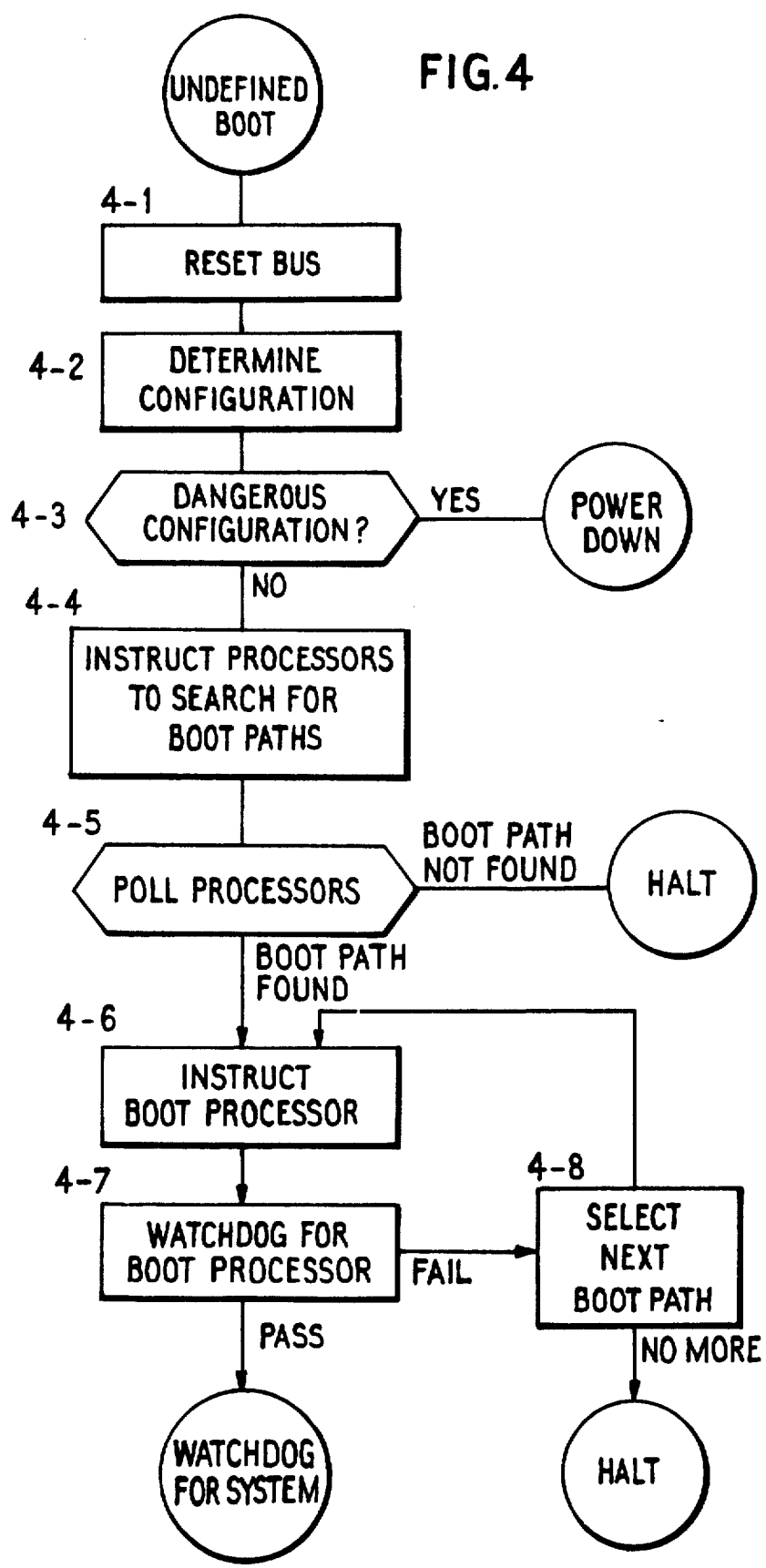
FIG. 4 is a flow diagram showing an undefined bootstrap procedure.

If the configuration is not dangerous then the CSM initiates the undefined bootstrap procedure (FIG. 4).

(3-7) If the actual configuration matches the expected configuration, the action is as follows. First, the CSM reads the normal load route NLR from the non-volatile store. As mentioned above, NLR specifies the normal bootstrap load path for the system. More specifically, it defines which one of the processing modules is to act as "boot processor", for performing the actual bootstrap operation, and specifies the peripheral device, or network interface, from which the bootstrap program is to be loaded. Alternatively, NLR may be an "undefined" code, in which case an exit is made to the undefined bootstrap procedure (FIG. 4).

(3-8) Assuming that NLR is not undefined, the next step is to send an instruction over the bus to specified processing module, requesting it to assume the role of boot processor.

As will be described later in more detail, the selected boot processor will then read in a bootstrap program from the specified peripheral device or interface. It will then execute this bootstrap program, to perform various system tests, and then to load operational programs into all the processing modules, including itself.

(3-9) While the boot processor is executing the bootstrap, the CSM runs in a watchdog mode, in which it monitors the operation of the boot processor, If the CSM detects that the bootstrap program has been successfully completed, it continues to act as a watchdog for the system in normal operation.

(3-10) If the bootstrap fails the CSM displays a diagnostic message. It then accesses the non-volatile store to read the alternative load route ALR. This specifies a particular processing module to act as boot processor (which may be the same as that specified by NLR) and a particular peripheral device from which the bootstrap program is to be loaded. Alternatively, ALR may be an "undefined" code, in which case an exit is made to the undefined bootstrap procedure.

(3-11) Assuming that ALR is not undefined, the CSM instructs the specified processing module to assume the role of boot processor.

(3-12) While the boot processor is executing the bootstrap, the CSM monitors it. If the bootstrap is successfully completed, the CSM continues to act as a watchdog for the system in normal operation. If, on the other hand, the bootstrap fails, the CSM displays a diagnostic message and halts.

Undefined boot

Referring now to FIG. 4, this shows the undefined bootstrap procedure performed by the CSM.

(4-1) The CSM resets the system bus.

(4-2) The CSM then interrogates in turn each slot position of the system bus, so as to determine the actual configuration of the system.

(4-3) The configuration is then checked to determine whether it is potentially dangerous. If a dangerous configuration is detected, the CSM immediately switches off the main power supply to prevent electrical damage. The CSM continues running on the standby power supply, and displays a diagnostic message.

(4-4) If the configuration is not dangerous, the CSM sends an instruction to each suitable processing module to search for potential bootstrap load paths. Suitable modules are those that are connected to peripheral devices or network interfaces, from which a bootstrap program might be loaded.

When a processing module receives this instruction, it checks all its attached peripheral devices and network interfaces, to determine whether any of them is able to provide a bootstrap program. The devices are inspected in a predetermined, fixed order, so as to ensure repeatability. All the processing modules that receive the instruction perform this search simultaneously, in parallel.

(4-5) The CSM then polls the modules to discover whether any potential bootstrap load paths have been found. This polling is done in a fixed, predetermined order, so as to ensure repeatability. If no bootstrap path is found, then the CSM displays a diagnostic message and halts.

(4-6) Assuming that a potential bootstrap load path is found, the CSM identifies the type of bootstrap. It then instructs the processing module that found this path to act as the boot processor.

(4-7) While the boot processor is executing the bootstrap, the CSM runs in the watchdog mode, monitoring the operation of the boot processor. If the bootstrap is successfully completed, the CSM continues to act as watchdog for the system in normal operation.

(4-8) If, on the other hand, the bootstrap fails, then the CSM selects the next potential bootstrap load path (if any), and the above steps are repeated.

Operation of processing module

Figure 5:
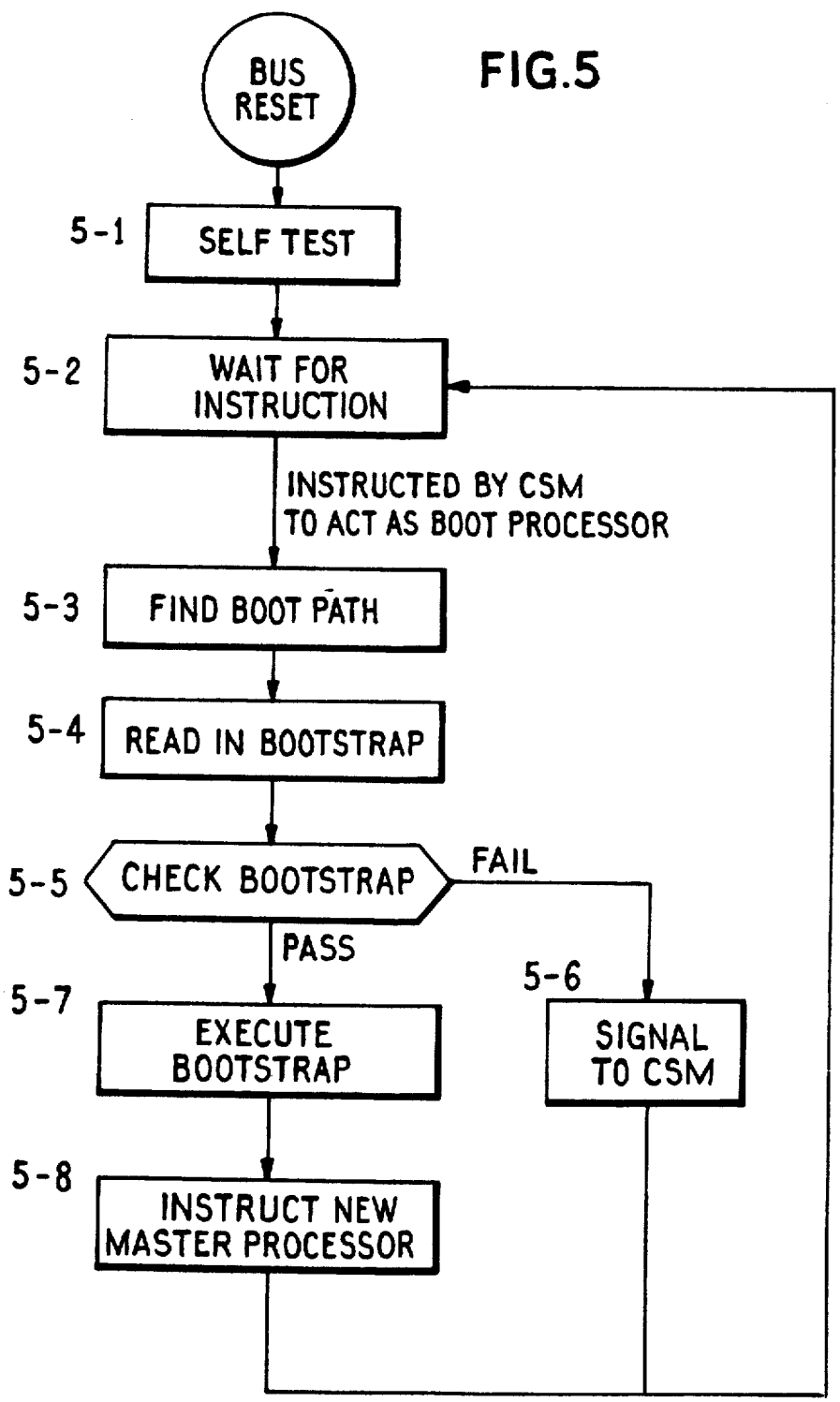
FIG. 5 is a flow diagram showing the operation of a processing module.

Referring now to FIG. 5, this shows the operation of a processing module, following a system bus reset.

(5-1) The first action is to run a self-test program to check the basic facilities of the module. This self-test program is non-corrupting, in the sense that it does not overwrite any data which may be required to be printed out in a diagnostic dump.

(5-2) The processing module then waits for an instruction over the system bus.

(5-3) If the module receives an instruction from the CSM to act as boot processor, the action is as follows. First, the module finds the bootstrap load path i.e. which peripheral or network interface is to be used for loading the bootstrap. In the case of a defined boot, this involves interrogating the non-volatile store in the CSM, to read NLR or ALR.

(5-4) The module then reads in the bootstrap program from the specified peripheral or network interface, into its own RAM.

(5-5) The bootstrap program is checked to ensure that it is suitable for this processing module. A sum check is also performed on the bootstrap program.

(5-6) If the checks fail, a message is sent back to the CSM to report the failure, and the processing module returns to its waiting state.

(5-7) Assuming the these checks are satisfactory, the boot processor now starts executing the bootstrap program. This causes each processing module to undergo further tests, and to load its operational programs from the selected peripheral device or network interface.

(5-8) When all the processing modules have been successfully loaded, the boot processor selects one of the modules to act as the system master, and notifies the CSM. The boot processor instructs the selected module to assume the role of master, and then returns to the waiting state.

The new system master will then start executing its loaded operational programs, and will start up the rest of the system. The system then runs in the normal manner.

In summary, it can be seen that the system described above provides two different bootstrap procedures.

(a) Defined bootstrap. This is the normal procedure when the system is powered up or restarted. This procedure is relatively fast, since the required bootstrap load path is specified in the non-volatile store, and so it is not necessary to search for potential bootstrap load paths.

(b) Undefined bootstrap. This procedure is entered automatically whenever the non-volatile store appears not to have been set up: for example, if its sum check fails or if the expected configuration does not match the actual configuration. This is slower than the defined bootstrap procedure, since it involves searching for potential bootstrap load paths.

We claim:

1. A data processing system comprising:
 (a) a plurality of data processing modules,
 (b) a plurality of program source devices respectively connected to said data processing modules,
 (c) a central services module connected to all said data processing modules, the central services module including:
  (i) a non-volatile memory for holding information identifying a predetermined one of said program source devices connected to a predetermined one of said data processing modules as a source of a bootstrap program,
  (ii) means for performing a said information held in check on said non-volatile memory, said check comprising determining if said information is valid information,
  (iii) means operative in the event that said check determines that said information comprises valid information, for instructing said predetermined one of said data processing modules to load said bootstrap program from said predetermined one of said program source devices, and
  (iv) means operative in the event that said check determined that said information comprises invalid information, for searching all of said program source devices for a bootstrap program and, when a bootstrap program is found in a particular one of said program source devices connected to a particular one of said data processing modules, instructing said particular one of said data processing modules to load said bootstrap program from said particular one of said program source devices.

* * * * *